Sept. 29, 1959  A. G. BADE  2,906,137
SPEED REDUCER
Filed Sept. 20, 1957  3 Sheets-Sheet 1

INVENTOR.
Alfred G. BADE
BY
Charles French
Attorneys

Sept. 29, 1959     A. G. BADE     2,906,137
SPEED REDUCER
Filed Sept. 20, 1957     3 Sheets-Sheet 2

INVENTOR.
Alfred G. BADE
BY

Sept. 29, 1959  A. G. BADE  2,906,137
SPEED REDUCER
Filed Sept. 20, 1957  3 Sheets-Sheet 3

INVENTOR.
Alfred G. BADE
BY
Attorneys

United States Patent Office 2,906,137
Patented Sept. 29, 1959

2,906,137

SPEED REDUCER

Alfred G. Bade, Brookfield, Wis., assignor to The Falk Corporation, Milwaukee, Wis., a corporation of Wisconsin Application September 20, 1957, Serial No. 685,160

2 Claims. (Cl. 74—421)

The invention relates to speed reducers.

One object of the invention is to provide a speed reducer adapted for mounting in the pedestal of a floor mounting.

A further object of the invention is to provide a speed reducer in which the gear box is pivotally mounted on its support around the output shaft and eccentrically of the input shaft so that the angular position of its motor driven pulley may be changed relative to the drive motor to permit different size drive motors being used without increasing or decreasing the height of the motor support originally used for one of these motors.

A further object of the invention is to provide a speed reducer in which the gear box is pivotally mounted on its support around the output shaft and eccentrically of the input shaft so that the angular position of its motor driven pulley may be changed relative to the pulley of its drive motor to tension the belt and thereby avoid the use of a sliding base connection between the drive motor and its support.

The invention further consists in the several features hereinafter described and more particularly defined by claims at the conclusion hereof.

Figure 1:
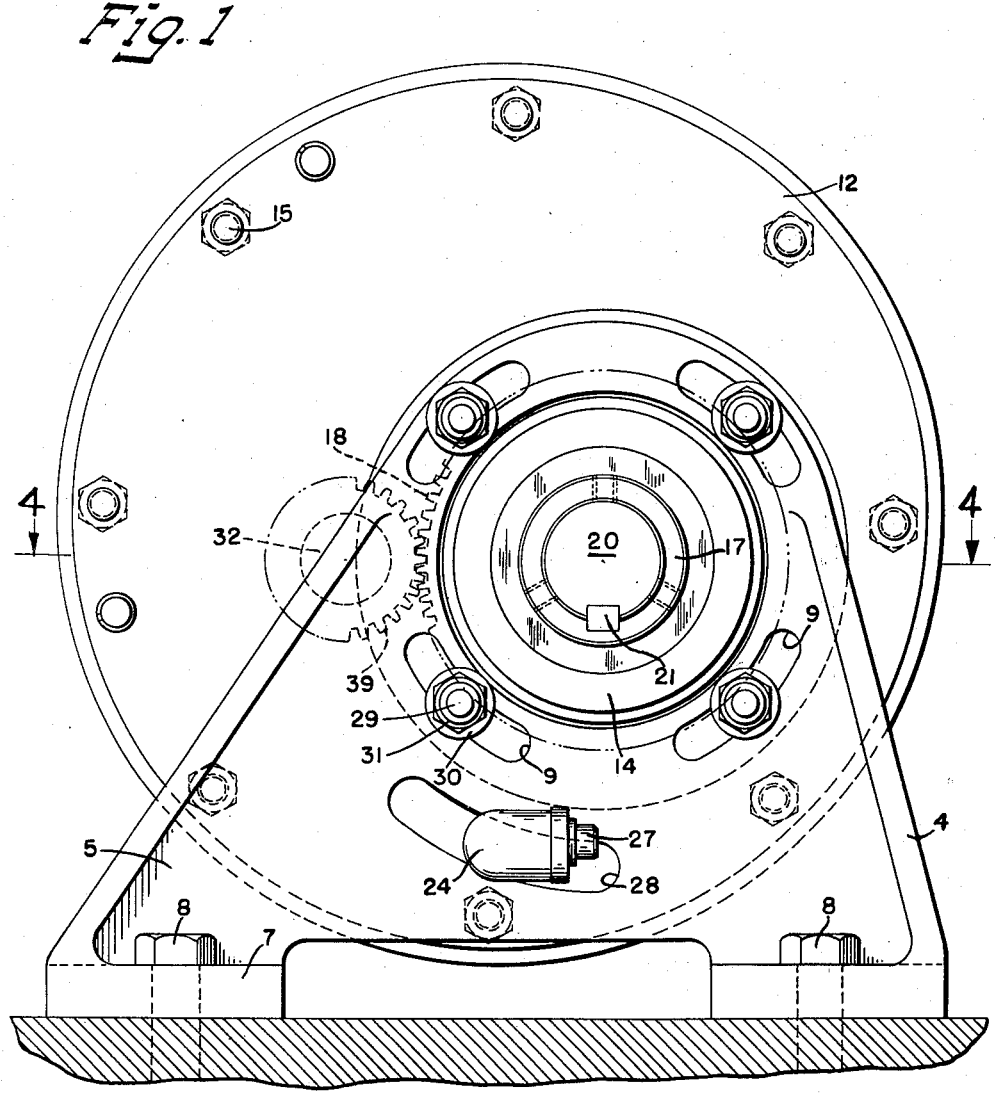
Fig. 1 is a rear elevational view of a speed reducer embodying the invention.

Referring to the drawings, the numeral 4 designates an upright support or pedestal having an upright panel portion 5 provided with a bore 6 and a flanged base 7 for the reception of screw bolts 8 to mount said pedestal on the floor or other fixed support. Adjacent the bore 6 the portion 5 is provided with a series of arcuate slots 9 concentric with said bore.

The speed reducer includes a circular panel member 10 having a roller thrust bearing 11 eccentrically mounted therein, an adapter supporting member 12 and a cover 13. The member 10 and the cover 13 form a gear box. The supporting member 12 is of the same circular contour as the panel member 10 and has a flanged hub 14 eccentrically formed therein and alined with the bearing 11, said hub having an annular pilot projection (shown in Fig. 2) fitting the bearing receiving bore of the panel 10 so that the load strains from external loading through the shaft 20 to the shaft 17 are transmitted through this hub directly to the support 5 and, therefore, relieve the studs 29 hereinafter referred to of any strains imposed by the load. Bolts 15 passing through radially disposed alined openings in the cover, panel member and supporting member and flat rings 16 of suitable sealing material clamp these parts together.

The inner race of the bearing 11 is mounted on a tubular output shaft 17 which has a large gear 18 suitably keyed thereto and which extends loosely through the hub 14 of the member 12, an oil sealing ring 19 being mounted between said shaft and hub. The shaft 17 is adapted to slide over the input shaft 20 of the mechanism to be driven and be secured thereto against rotation by a key connection 21. Since the bearings 11 for the shaft 17 are through the panel 10 and its axially alined fit with the adapter 12 which in turn has an axially alined fit in the bore 6 of the pedestal 5, precise alinement between the shafts 17 and 20 can be obtained.

The cover 13 has circumferentially spaced openings 22 which may be open or plugged depending upon the angular position of the reducer unit relative to the shaft 20. As shown, the top opening 22 has a breather plug 23 mounted therein, and the other opening 22 is open to determine the oil level in the housing formed between the cover 13 and the panel member 10.

Figure 2:
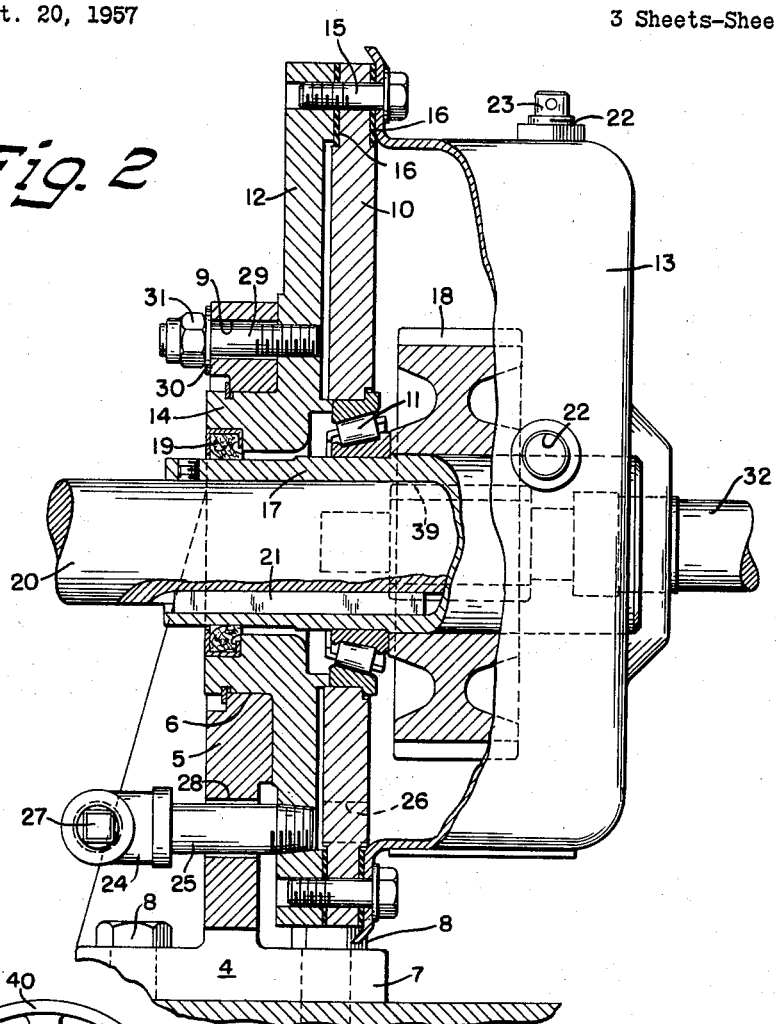
Fig. 2 is a side elevational view of the reducer, parts being broken away and parts being shown in section.

A fitting 24 has a pipe connection 25 extending into the adapter member 12, and the panel member has an opening 26, shown in dotted in Fig. 2, to allow oil to drain into the fitting 24, said fitting having a removable plug 27. The pedestal has an arcuate slot 28 to allow movement of the fitting 24 relative thereto.

The reducer unit is held in various positions of angular adjustment relative to the shafts 17 and 20 by a series of radially disposed circumferentially spaced studs 29 that are anchored in the adapter member 12, extend through the slots 9 in the pedestal, and carry washers 30 and clamping nuts 31. Bolts may be used in place of the studs and nuts, if desired, but as previously noted these fasteners are not subjected to external load strains from the shaft 17.

Figure 3:
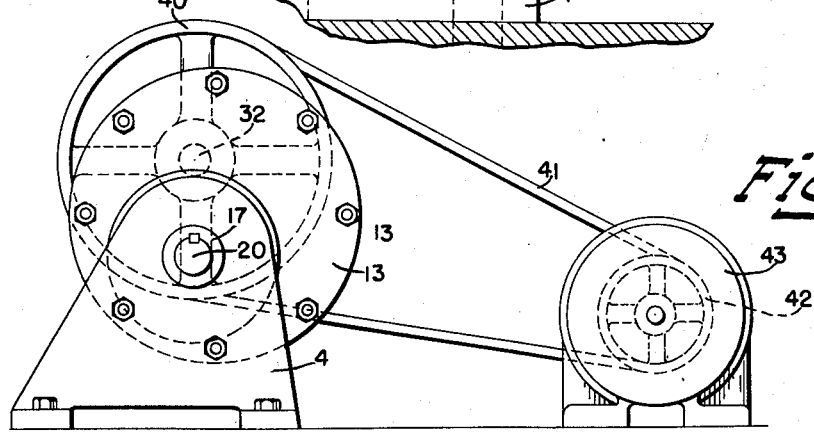
Fig. 3 is a diagrammatic view of the speed reducer and its motor drive.
Figure 4:
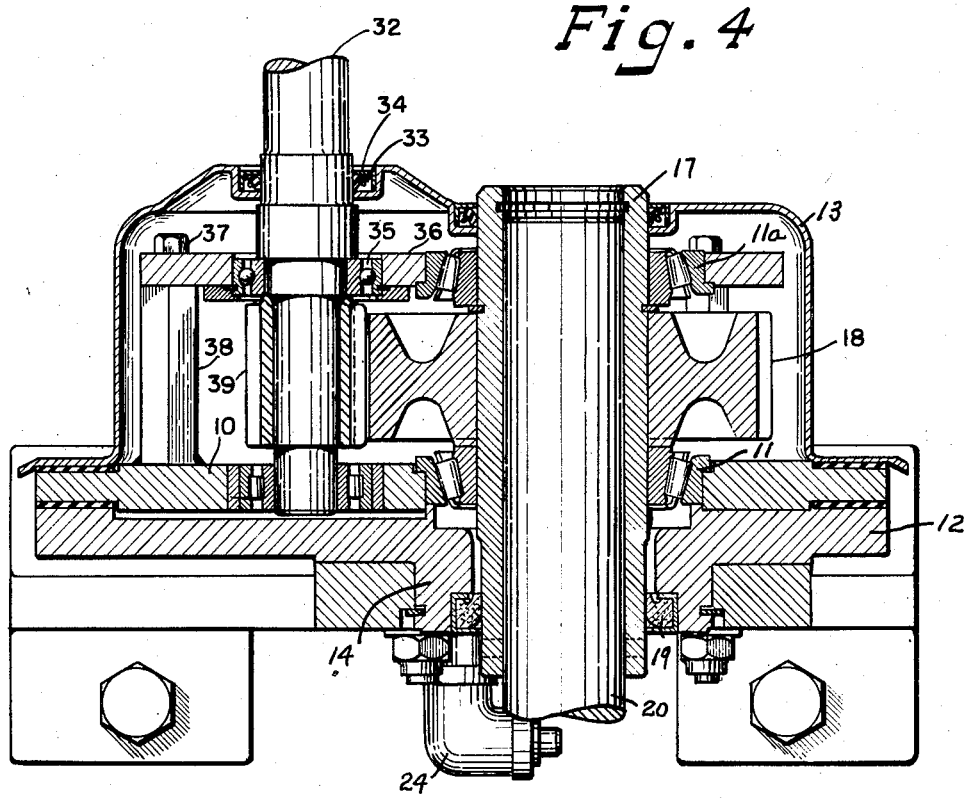
Fig. 4 is a horizontal sectional view taken on the line 4—4 of Fig. 1.

An input shaft 32 extends through an opening 33 in the cover provided with an oil sealing ring 34 and is mounted in a bearing 35 carried by an auxiliary panel 36 that is suspended from the panel member 10 by its bolted connection 37 with lugs 38, one being shown, welded or integral with said member 10. The shaft 32 at its inner end carries a pinon 39 meshing with the gear 18 to provide a speed reduction between the input and the output shafts and at its exposed outer end may carry a pulley 40 as indicated in Fig. 3 for connection by a belt 41 with a pulley 42 on the drive shaft of an electric motor 43. An auxiliary bearing 11a for the shaft 17 is also mounted in the panel 36.

Figure 5:
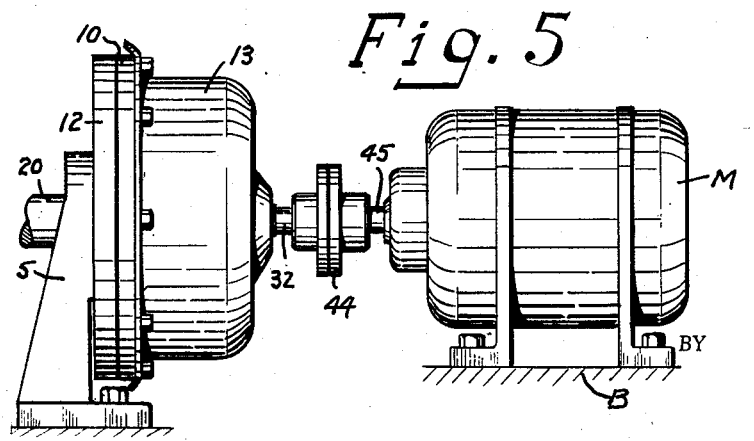
Fig. 5 is a side elevational view of a speed reducer embodying the invention showing another adaptation to its motor drive.

In Fig. 5 the speed reducer above described is shown in side elevation from its showing in Fig. 1, and its input shaft 32 is direct connected by a suitable flexible coupling 44 with the drive shaft 45 of an electric motor M mounted on a base support B. With this drive arrangement a larger motor may be used on the same support B by turning the reducer unit to raise its input shaft 32 to a height to aline with the drive shaft of this larger motor which is adjusted laterally on the support B as compared to the position of the smaller motor to aline the shafts horizontally.

It will be noted from Figs. 1 and 3 that the input shaft 32 is eccentrically disposed relative to the output shaft 17 so that by angularly adjusting the parts associated with said shaft relative to the same the shaft 32 and consequently the pulley 40 may assume different positions relative to the pedestal 4. Use is made of this feature to, as shown in Fig. 3, angularly adjust the pulley 40 to tighten the belt 41 and also permits the pulley 40 being angularly adjusted to different height positions relative to the base so that the same pulley and belt drive between the drive motor and the unit may be used where it is desired to drive the mechanism to be driven with larger or smaller size motors. Under these conditions the size of the motor presents no problem in its mounting on its support since variance in motor dimensions and hence its drive pulley height may be compensated for by raising or lowering the shaft 32, and this may be done without having to block up or otherwise adjust the motor to its own support.

I desire it to be understood that this invention is not to be limited to any particular form or arrangement of parts except in so far as such limitations are included in the claims.

What I claim as my invention is:

1. A speed reducer comprising a gear box including a rear panel member having a bore; an output shaft journaled in said bore of said member; an input shaft journaled in said gear box eccentrically of said output shaft; reduction gearing between said shafts; an adapter supporting member secured to said rear panel member and having a piloted journal connection with said bore in said rear panel member; a pedestal for mounting on a fixed support; a rotary mounting connection between said pedestal and said adapter member; and clamping means for clamping said adapter member to said pedestal including a series of circumferentially spaced slots in said pedestal radially disposed relative to said output shaft and fastening means anchored in said adapter member and extending through said slots and exerting a clamping pressure between said adapter and said pedestal.

2. A speed reducer comprising a gear box including a rear panel member having a bore; an output shaft journaled in said bore; an input shaft journaled in said gear box eccentrically of said output shaft; gearing between said shafts; an adapter supporting member secured to said rear panel member and having a piloted journal connection with said bore; a pedestal for mounting on a fixed support; a rotary mounting connection between said pedestal and said adapter member; said connection including a bore in said pedestal aligned with the axis of the output shaft and the bore in said panel member; and a load strain receiving hub on said adapter supporting member journaled in said pedestal bore.

References Cited in the file of this patent

UNITED STATES PATENTS

| | | |
|---|---|---|
| 1,393,906 | Ramsey | Oct. 18, 1921 |
| 1,778,432 | Ramsey | Oct. 14, 1930 |
| 2,813,435 | Schumb | Nov. 19, 1957 |